United States Patent
Chelba et al.

(10) Patent No.: US 7,831,428 B2
(45) Date of Patent: Nov. 9, 2010

(54) SPEECH INDEX PRUNING

(75) Inventors: Ciprian I. Chelba, Seattle, WA (US); Alejandro Acero, Bellevue, WA (US); Jorge F. Silva Sanchez, Los Angeles, CA (US)

(73) Assignee: Microsoft Corporation, Redmond, WA (US)

( * ) Notice: Subject to any disclaimer, the term of this patent is extended or adjusted under 35 U.S.C. 154(b) by 774 days.

(21) Appl. No.: 11/270,673

(22) Filed: Nov. 9, 2005

(65) Prior Publication Data

US 2007/0106512 A1     May 10, 2007

(51) Int. Cl.
    *G10L 21/00*     (2006.01)
(52) U.S. Cl. .................. 704/270; 707/706; 707/711; 707/741; 707/742
(58) Field of Classification Search ............... 704/270, 704/3; 707/3, 706, 711, 741, 742
    See application file for complete search history.

(56) References Cited

U.S. PATENT DOCUMENTS

| | | | | |
|---|---|---|---|---|
| 4,783,803 A | * | 11/1988 | Baker et al. ............... 704/252 |
| 4,977,598 A | * | 12/1990 | Doddington et al. ........ 704/255 |
| 5,199,077 A | | 3/1993 | Wilcox et al. ............. 704/256 |
| 5,241,619 A | | 8/1993 | Schwartz et al. ........... 704/200 |
| 5,745,899 A | * | 4/1998 | Burrows .................... 707/102 |
| 5,799,276 A | | 8/1998 | Komissarchik et al. ..... 704/251 |
| 5,963,940 A | * | 10/1999 | Liddy et al. ................. 707/5 |
| 6,006,221 A | * | 12/1999 | Liddy et al. ................. 707/5 |
| 6,047,283 A | * | 4/2000 | Braun ......................... 707/3 |
| 6,169,972 B1 | | 1/2001 | Kono et al. |
| 6,185,527 B1 | | 2/2001 | Petkovic et al. ............ 704/231 |
| 6,205,428 B1 | * | 3/2001 | Brown et al. ............... 704/270 |
| 6,266,658 B1 | * | 7/2001 | Adya et al. ..................... 1/1 |
| 6,345,253 B1 | * | 2/2002 | Viswanathan ............... 704/272 |
| 6,374,220 B1 | * | 4/2002 | Kao ........................... 704/255 |
| 6,397,181 B1 | | 5/2002 | Li et al. .................... 704/256.4 |
| 6,421,645 B1 | | 7/2002 | Beigi et al. |
| 6,424,946 B1 | | 7/2002 | Tritschler et al. |
| 6,584,458 B1 | | 6/2003 | Millett et al. ................ 707/3 |
| 6,611,803 B1 | * | 8/2003 | Furuyama et al. .......... 704/254 |
| 6,678,689 B2 | | 1/2004 | Yoon et al. |

(Continued)

FOREIGN PATENT DOCUMENTS

EP     1 043 665 A2    10/2000

(Continued)

OTHER PUBLICATIONS

X. L. Aubert, "Fast look-ahead pruning strategies in continuous speech recognition," in Proc. ICASSP-89, 1989, pp. 659-662.*

(Continued)

*Primary Examiner*—Richemond Dorvil
*Assistant Examiner*—Greg A Borsetti
(74) *Attorney, Agent, or Firm*—Westman, Champlin & Kelly, P.A.

(57) ABSTRACT

A speech segment is indexed by identifying at least two alternative word sequences for the speech segment. For each word in the alternative sequences, information is placed in an entry for the word in the index. Speech units are eliminated from entries in the index based on a comparison of a probability that the word appears in the speech segment and a threshold value.

9 Claims, 9 Drawing Sheets

U.S. PATENT DOCUMENTS

| | | | |
|---|---|---|---|
| 6,760,702 B2 | 7/2004 | Chien et al. | |
| 6,829,613 B1* | 12/2004 | Liddy | 707/694 |
| 6,873,993 B2* | 3/2005 | Charlesworth et al. | 707/102 |
| 6,877,134 B1 | 4/2005 | Fuller et al. | 715/202 |
| 6,907,397 B2 | 6/2005 | Kryze et al. | 704/251 |
| 7,089,188 B2* | 8/2006 | Logan et al. | 704/270 |
| 7,092,883 B1* | 8/2006 | Gretter et al. | 704/242 |
| 7,216,077 B1* | 5/2007 | Padmanabhan et al. | 704/240 |
| 7,266,553 B1* | 9/2007 | Anderson et al. | 707/5 |
| 7,313,554 B2* | 12/2007 | Chen et al. | 707/3 |
| 7,379,870 B1 | 5/2008 | Belvin et al. | 704/255 |
| 7,401,019 B2 | 7/2008 | Seide et al. | |
| 7,634,407 B2 | 12/2009 | Chelba et al. | |
| 2002/0022960 A1 | 2/2002 | Charlesworth et al. | |
| 2002/0052870 A1 | 5/2002 | Charlesworth et al. | |
| 2002/0111792 A1 | 8/2002 | Cherny | |
| 2002/0143536 A1 | 10/2002 | Chien et al. | |
| 2002/0184196 A1 | 12/2002 | Lehmeier et al. | 707/3 |
| 2003/0055634 A1* | 3/2003 | Hidaka et al. | 704/222 |
| 2003/0088397 A1 | 5/2003 | Karas et al. | 704/1 |
| 2003/0177108 A1 | 9/2003 | Charlesworth et al. | |
| 2003/0187643 A1 | 10/2003 | Van Thong et al. | 704/254 |
| 2003/0187649 A1* | 10/2003 | Logan et al. | 704/260 |
| 2003/0200091 A1 | 10/2003 | Furuyama et al. | |
| 2003/0204399 A1 | 10/2003 | Wolf et al. | |
| 2004/0044952 A1* | 3/2004 | Jiang et al. | 715/500 |
| 2004/0162730 A1 | 8/2004 | Mahajan et al. | |
| 2004/0199385 A1 | 10/2004 | Deligne et al. | 704/235 |
| 2005/0010412 A1 | 1/2005 | Aronowitz | |
| 2005/0027717 A1* | 2/2005 | Koudas et al. | 707/100 |
| 2005/0060139 A1 | 3/2005 | Corston-Oliver et al. | 704/1 |
| 2005/0080631 A1 | 4/2005 | Abe et al. | 704/276 |
| 2005/0096908 A1 | 5/2005 | Bacchiani et al. | 704/257 |
| 2005/0108012 A1 | 5/2005 | Roth et al. | |
| 2005/0119885 A1 | 6/2005 | Axelrod et al. | 704/231 |
| 2005/0159953 A1 | 7/2005 | Seide et al. | 704/254 |
| 2005/0203751 A1 | 9/2005 | Stevens et al. | |
| 2005/0228671 A1 | 10/2005 | Olorenshaw et al. | 704/260 |
| 2006/0074895 A1 | 4/2006 | Belknap | 707/4 |
| 2006/0212294 A1 | 9/2006 | Gorin et al. | 704/245 |
| 2006/0265222 A1 | 11/2006 | Chelba et al. | 704/240 |
| 2007/0005574 A1 | 1/2007 | Crispo et al. | 707/3 |
| 2007/0106509 A1 | 5/2007 | Acero et al. | 704/240 |
| 2007/0106512 A1 | 5/2007 | Acero et al. | 704/260 |
| 2007/0143110 A1 | 6/2007 | Acero et al. | 704/251 |

FOREIGN PATENT DOCUMENTS

| | | |
|---|---|---|
| EP | 01113371 | 4/2001 |
| WO | WO 00/54168 A2 | 9/2000 |
| WO | WO 02/27546 A2 | 4/2002 |

OTHER PUBLICATIONS

[27] L.-S. Lee and B. Chen, "Spoken document understanding and organization," IEEE Signal Processing Mag., vol. 22, No. 5, pp. 42-60, 2005.*

J. V. Thong, P. J. Moreno, B. Logan, B. Fidler, K. Maffey, and M. Moores, SPEECHBOT: An Experimental Speech-Based Search Engine for Multimedia Content in the Web: Compaq Cambridge Res. Lab. Tech. Rep., CRL 2001/06, 2001.*

Dharanipragada, S., and Roukos, S. A Fast vocabulary independent algorithm for spotting words in speech. In Proceedings of ICASSP 98, 1998.*

Huang, X., Acero, A., Alleva, F., Hwang, M., Jiang, L. and Mahajan, M. Microsoft Windows Highly Intelligent Speech Recognizer: Whisper. In IEEE International Conference on Acoustics, Speech, and Signal Processing, May 1995, vol. 1, pp. 93-96.*

Cyril Allauzen, Mehryar Mohri, Murat Saraclar. "General Indexation of Weighted Automata—Application to Spoken Utterance Retrieval" in Proc. HLT-NAACL, 2004.*

Kenneth Ward Church, "Speech and Language Processing: Where have we been and where are we going?," in *Proceedings of Eurospeech*, Geneva, Switzerland, 2003.

J. Garofolo, G. Auzanne, and E. Voorhees, "The TREC spoken document retrieval track: A success story," in *Proceedings of the Recherche d'Informations Assiste par Ordinateur: ContentBased Multimedia Information Access Conference*, Apr. 2000.

M. G. Brown, J. T. Foote, G. J. F. Jones, K. Sparck Jones, and S. J. Young, "Open-vocabulary speech indexing for voice and video mail retrieval," in *Proc. ACM Multimedia 96*, Boston, Nov. 1996.

David Anthony James, "The Application of Classical Information Retrieval Techniques to Spoken Documents," Ph.D. thesis, University of Cambridge, Downing College, 1995.

Ciprian Chelba and Alex Acero, "Position specific posterior lattices for indexing speech," in *Proceedings of ACL*, Ann Arbor, Michigan, Jun. 2005.

Sergey Brin and Lawrence Page, "The anatomy of a large-scale hypertextual web search engine," *Computer Networks and ISDN Systems*, vol. 30, No. 1-7, pp. 107-117, 1998.

L. R. Rabiner, "A tutorial on hidden markov models and selected applications in speech recognition," in *Proceedings IEEE*, 1989, vol. 77(2), pp. 257-285.

James Glass, T. J. Hazen, Lee Hetherington, and Chao Wang, "Analysis and processing of lecture audio data: Preliminary investigations," in *HLT-NAACL 2004 Workshop: Interdisciplinary Approaches to Speech Indexing and Retrieval*, Boston, Massachusetts, May 2004, pp. 9-12.

International Search Report and Written Opinion of the International Searching Authority for Application No. PCT/US2006/042723 filed Oct. 31, 2006. Date of Mailing: Mar. 30, 2007.

B. Logan, P. Moreno, and O. Deshmukh. 2002. Word and sub-word indexing approaches for reducing the effects of OOV queries on spoken audio. In *Proc. HLT*.

Kenney Ng. 2000. *Subword-Based Approaches for Spoken Document Retrieval*. Ph.D. thesis, Massachusetts Institute of Technology.

Murat Saraclar and Richard Sproat. 2004. Lattice-based search for spoken utterance retrieval. In *HLT-NAACL 2004: Main Proceedings*, pp. 129-136, Boston, Massachusetts, USA, May 2-May 7.

F. Seide and P. Yu. 2004a. A hybrid word/phonemebased approach for improved vocabulary-independent search in spontaneous speech. In *Proceedings of IC-SLP*, Jeju, Korea.

F. Seide and P. Yu. 2004b. Vocabulary-independent search in spontaneous speech. In *Proceedings of ICASSP*, Montreal, Canada.

Matthew A. Siegler. 1999. *Integration of Continuous Speech Recognition and Information Retrieval for Mutually Optimal Performance*. Ph.D. thesis, Carnegie Mellon University.

Mangu et al., L., "Finding consensus in speech recognition: word error minimization and other applications of confusion networks", Computer Speech and Language vol. 14, No. 4, Oct. 7, 2000.

MSN Search, "Index Serving Core", design specification, 2004.

P.C. Woodland, S.E. Johnson, P. Jourlin and K. Spärck Jones. 2000. Effects of out of vocabulary words in spoken document retrieval, In *Proceedings of SIGIR*, pp. 372-374, Athens, Greece.

Chelba et al., C. "SPEECH OGLE: Indexing Uncertainty for Spoken Document Search", Proceedings of the ACL Interactive Poster and Demonstration Sessions, pp. 41-44, Ann Arbor, Jun. 2005.

Method and Apparatus for Indexing Speech, filed May 20, 2005, U.S. Appl. No. 11/133,515, pp. 1-33 and 7 sheets of drawings.

Glavitsch, P. Schäuble, and M. Wechsler, "Metadata for Integrating Speech Documents in a Text Retrieval System," ACM SIGMOD Rec., vol. 23, No. 4, pp. 57-63, 1994.

Bulyko, I., Ostendorf, M., Stolcke, A.: Getting More Mileage from Web Text Sources for Conversational Speech Language Modeling Using Class-Dependent Mixtures. In Hearst, M., Ostendorf, M. eds.: Proc. HLT-NAACL. vol. 2., Edmonton, Alberta, Canada, Association for Computational Linguistics (2003) 7-9.

N. Moreau, N. G. Kim and T. Sikora. Phone-based spoken document retrieval in conformance with the MPEG-7 standard. Proc. of the Audio Engineering Society 25th Intl. Conf., 2004.

A.T. Lindsay, S. Srinivasan, J.P.A. Charlesworth, P.N. Garner and W. Kriechbaum, "Representation and linking mechanisms for audio in MPEG-7," Signal Processing: Image Commun., vol. 16, pp. 193-209, 2000.

Moreau N., Kim H.G., Sikora T., "Combination of Phone N-Grams for a MPEG-7 based Spoken Document Retrieval System", to be published in EUSIPCO 2004.

Charlesworth J.P.A. and Garner P.N., "SpokenContent Representation in MPEG-7", IEEE Trans. on Circuits and Systems for Video Technology, vol. 11, No. 6, pp. 730-736, Jun. 2001.

Official Search Report and Written Opinion of the Korean Patent Office in foreign application No. PCT/US2006/042733, filed Oct. 31, 2006.

J.T. Foote, S.J. Young, G.J.F Jones and K. Sparck Jones, 1997, "Unconstrained Keyword Spotting Using Phone Lattices with Application to Spoken Document Retrieval", Computer Speech and Language 11(2):207-224.

Yue-Shi Lee and Hsin-Hsi Chen, "A Multimedia Retrieval System for Retrieving Chinese Text and Speech Documents", 1999.

D.A. James, "The Application of Classical Information Retrieval Techniques to Spoken Documents", PhD Thesis, Cambridge University, Downing College, Feb. 1995.

Lidia Mangu, Eric Brill, Andreas Stolcke, "Finding Consensus Among Words: Lattice-Based Word Error Minimization", Sep. 1999.

Yang Liu, Mary P. Harper, Michael T. Johnson, Leah H. Jamieson, "The Effect of Pruning and Compression on Graphical Representations of the Output of a Speech Recognizer", Feb. 14, 2002.

Hillard et al., "Improving Automatic Sentence Boundary Detection with Confusion Networks", 2004.

Peter S., Cardillo, Mark Clements and Michael S. Miller, "Phonetic Searching vs. LVCSR: How to Find What You Really Want in Audio Archives", 2002.

Begeja et al., "A System for Searching and Browsing Spoken Communications", 2004.

Alexandre Ferrieux and Stephane Peillon, "Phoneme-Level Indexing for Fast and Vocabulary-Independent Voice/Voice Retrieval", 1999.

Alluzen et al., "Open Vocabulary ASR for Audiovisual Document Indexation", ICASSP 2005.

Yue-Shi Lee and Hsin-Hsi Chen, "Metadata for Integrating Chinese Text and Speech Documents in a Multimedia Retrieval System", 1997.

Lidia Mangu and Eric Brill, "Lattice Compression in the Consensual Post-Processing Framework", 1999.

First Office Action from Chinese application No. 200680041464.0, filed Oct. 31, 2006; dated Nov. 27, 2009.

Oard et al., D.W., "Building an Information Retrieval Test Collection for Spontaneous Conversational Speech", in proceedings of SIGIR '04, pp. 41-48, Jul. 2004.

Charlesworth et al., J.P.A., "Spoken Content Metadata and MPEG-7", in proceedings of ACM Multimedia Workshop, pp. 81-84, Oct./Nov. 2000.

Ljolje, A., Pereira, F. & Riley, M. (1999) "Efficient General Lattice Generation and Rescoring" In proceedings of the 6th European Conference on Speech Communication and Technology, vol. 3, pp. 1251-1254, Budapest.

Ulrike Glavitsch, Peter Schauble, Martin Wechsler, "Metadata for Integrating Speech Documents in a Text Retrieval System", 1994.

Douglas Oard, Bhuvana Ramabhadran, and Samuel Gustman (2004). Building an Information Retrieval Test Collection for Spontaneous Conversational Speech. In Proceedings of SIGIR 2004.

J.P.A. Charlesworth and P.N. Garner, "Spoken content metadata and MPEG-7," in Proc. ACM MM2000 Workshops, 2000, pp. 81-84.

\* cited by examiner $n_1[0] = \langle s \rangle$ $n_2[1] = \text{They}$ $n_3[2] = \text{are}$ $n_4[0] = \langle s \rangle$ $n_5[1] = \text{There}$ $n_6[2] = \text{in}$ ⌒ 600

$n_6[3] = \text{in}$ ⌒ 602

$n_7[3] = \text{two}$ $n_7[4] = \text{two}$ $n_8[3] = \text{into}$ $n_9[4] = \text{very}$ $n_9[5] = \text{very}$ ⌒ 604

$n_{10}[5] = \text{very}$ ⌒ 606

$n_{10}[6] = \text{very}$ $n_{11}[6] = \text{big}$ $n_{11}[7] = \text{big}$ $n_{12}[7] = \text{houses}$ $n_{12}[8] = \text{houses}$ $n_{13}[8] = \langle e \rangle$ $n_{13}[9] = \langle e \rangle$

802 — document_id[1], segment_id[1], position[1], probability[1]

804 — document_id[1], segment_id[1], position[2], probability[2]

⋮

806 — document_id[1], segment_id[1], position[n], probability[n]

808 — document_id[1], segment_id[2], position[1], probability[1]

document_id[1], segment_id[2], position[2], probability[2]

⋮

810 — document_id[1], segment_id[2], position[n], probability[n]

812 — document_id[2], segment_id[1], position[n], probability[n]

⋮

814 — document_id[T], segment_id[v], position[v], probability[v]

FIG. 8

SPEECH INDEX PRUNING

BACKGROUND

The present invention relates to indexing spoken documents and, more particularly, to pruning indexes of the spoken documents.

Searching through vast collections of documents for a particular document of interest has become commonplace in computing environments. In particular, searches performed on web pages found on the Internet are performed by a large number of search services.

To perform these text-based searches, search services typically construct an inverted index that has a separate entry for each word found in the documents covered by the search service. Each entry lists all of the documents and the positions within the documents where the word can be found. Many of these search services use the position information to determine if a document contains words in a particular order and/or within a particular distance of each other. This order and distance information can then be used to rank the documents based on an input query with documents that have the words of the query in the same order as the query being ranked higher than other documents. Without the position information, such document ranking based on word order is not possible.

Attempts have been made to construct indices for spoken documents, where a spoken document is a speech signal or multiple speech signals that have been grouped together as a single entity. For example, speech signals associated with a particular meeting or a lecture could be grouped as a single spoken document. Also, a multimedia document such as a movie or an animation can be considered a spoken document.

In order to index a spoken document, the speech signals must first be converted into text. This is done by decoding the speech signal using a speech recognition system. Such speech recognition systems use acoustic models and language models to score possible word sequences that could be represented by the speech signal. In many systems, a lattice of possible word strings is constructed based on the speech signal and the path through the lattice that has the highest score is identified as the single word string represented by the speech signal.

In speech indexing systems of the past, this single best estimate of the text from the speech signal is used to create the index for the spoken document. Using a single string output from the speech recognizer provides the ability to mark the position of particular words relative to each other in the spoken document. Thus, the same ranking systems that have been developed for textual indexing can be applied to these spoken document indexing systems.

Unfortunately, speech recognition is not perfect. As a result, the recognized text contains errors. This produces an index with errors, making the systems unreliable during search.

The discussion above is merely provided for general background information and is not intended to be used as an aid in determining the scope of the claimed subject matter.

SUMMARY

A speech segment is indexed by identifying at least two alternative word sequences for the speech segment. For each word in the alternative sequences, information is placed in an entry for the word in the index. Speech units are eliminated from entries in the index based on a comparison of a probability that the word appears in the speech segment and a threshold value.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 6 shows an association between words and nodes that have been divided into positions.

FIG. 8 is an example of a portion of a speech index.

DETAILED DESCRIPTION

Exemplary Environment

Figure 1:
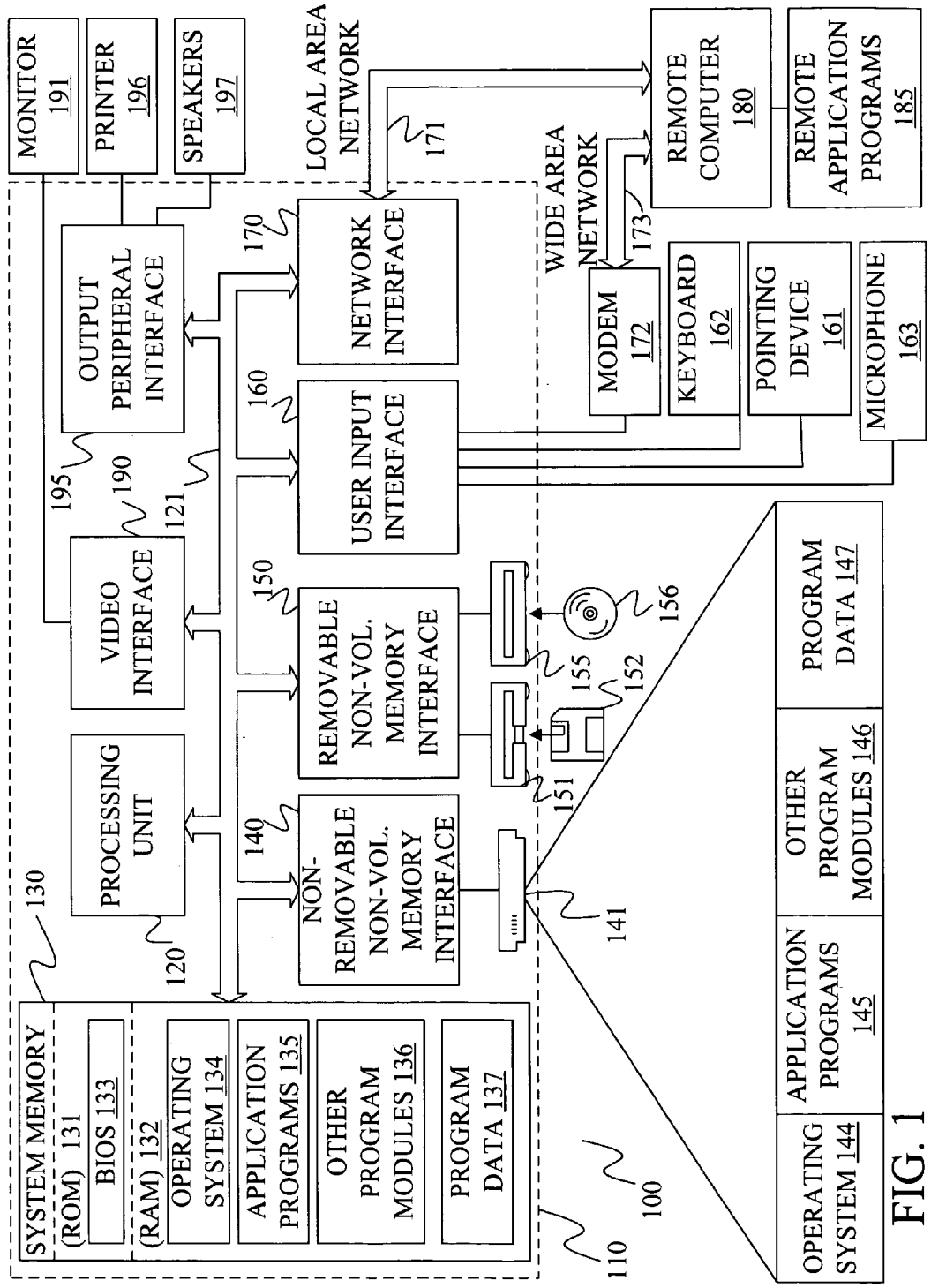
FIG. 1 is a block diagram of a computing environment.

FIG. 1 illustrates an example of a suitable computing system environment 100 on which embodiments may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
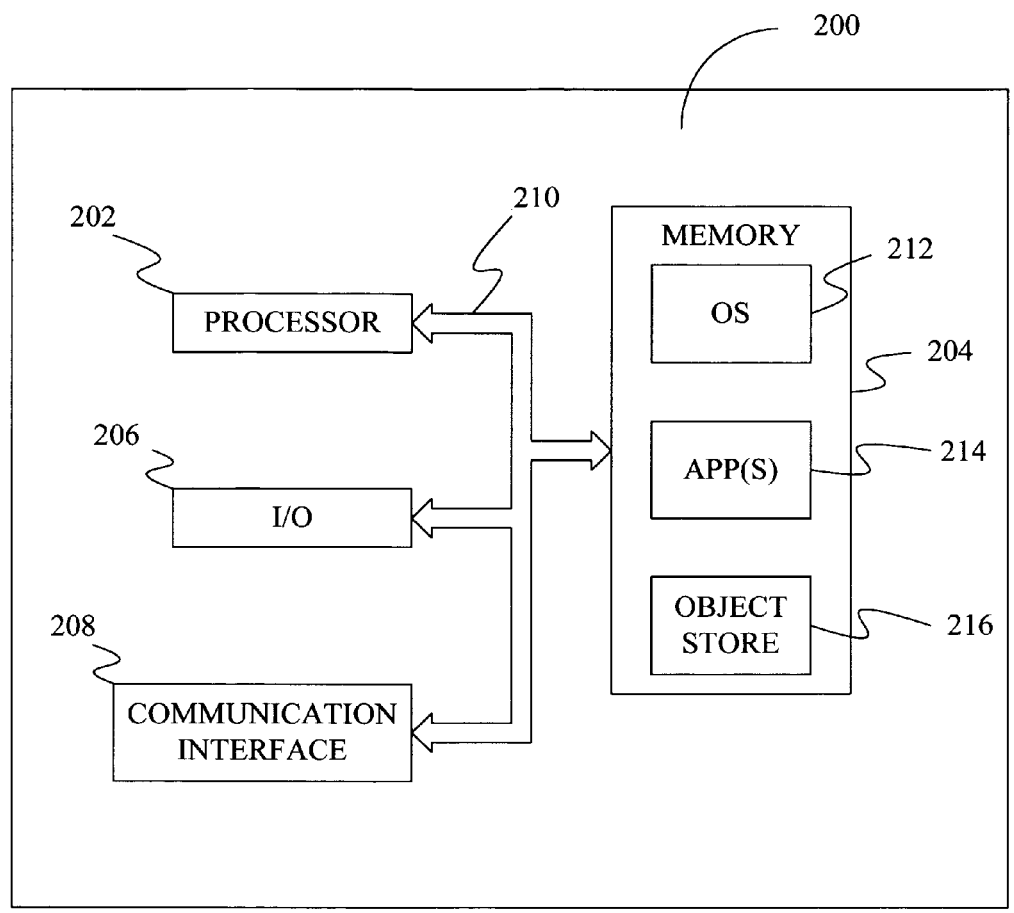
FIG. 2 is a block diagram of a mobile device computing environment.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

Indexing Spoken Documents

Figure 3A:
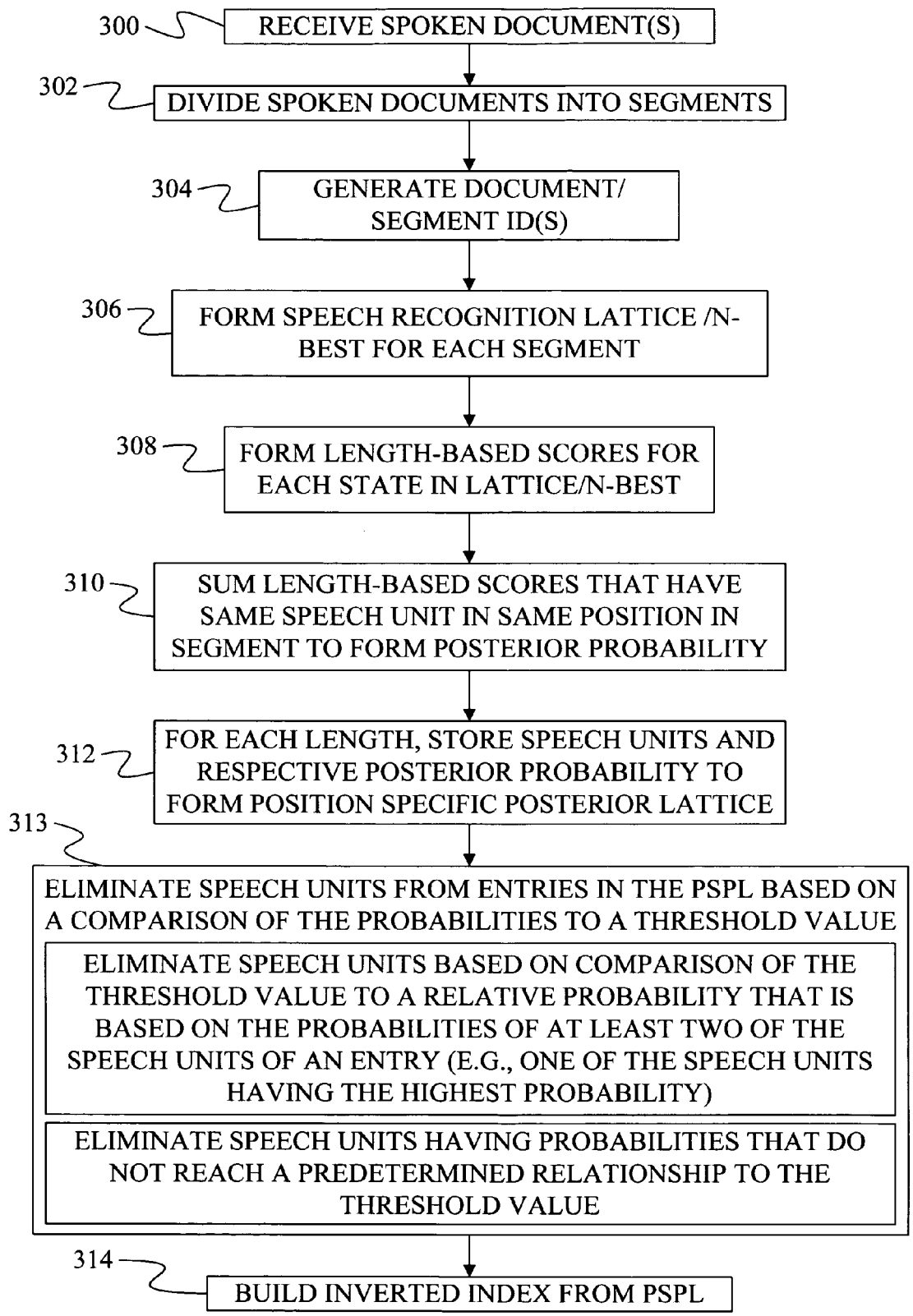
FIGS. 3A and 3B respectively are flow diagrams of a method of indexing a speech segment and searching the index of the speech segment.
Figure 3B:
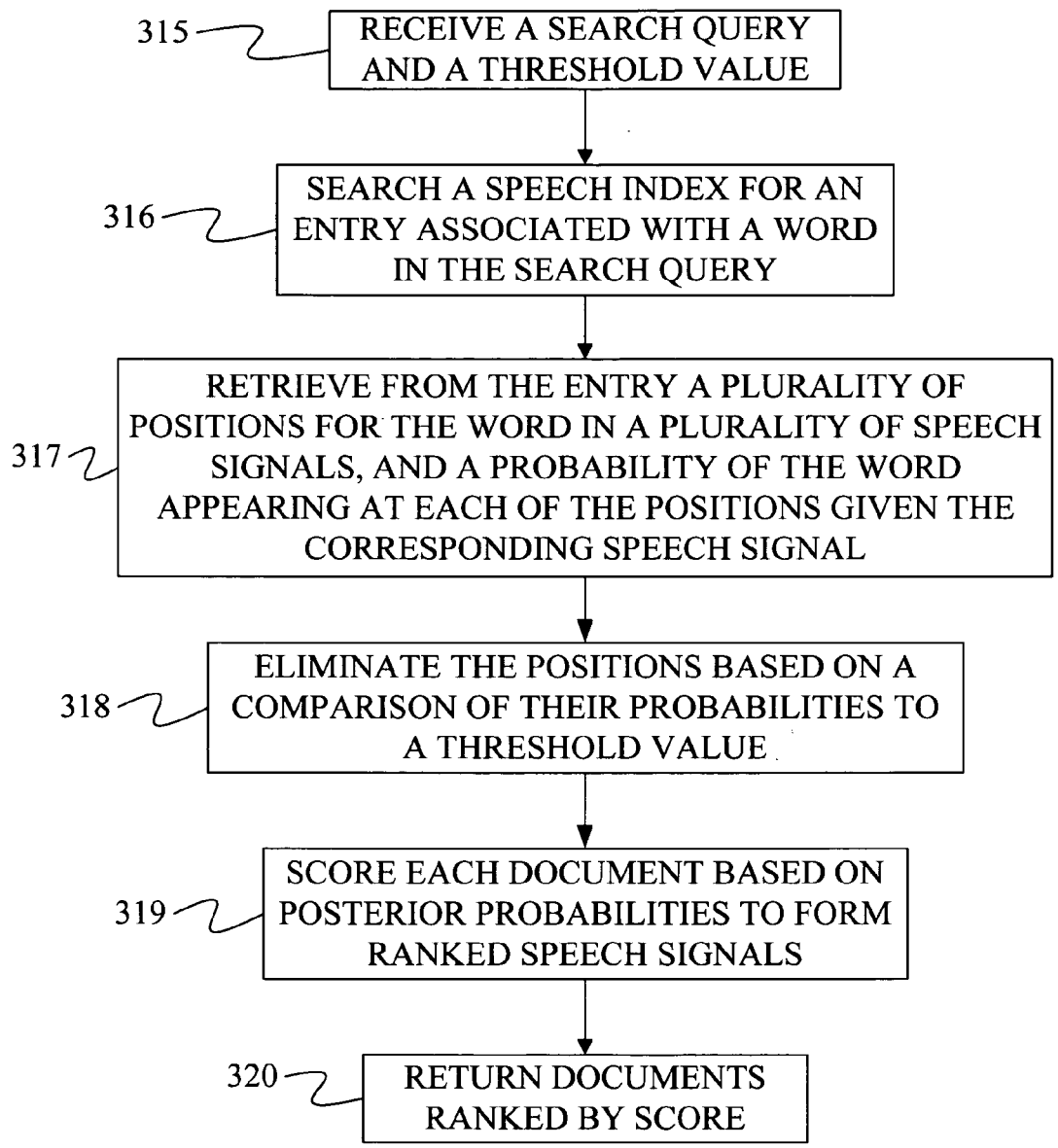
Figure 4:
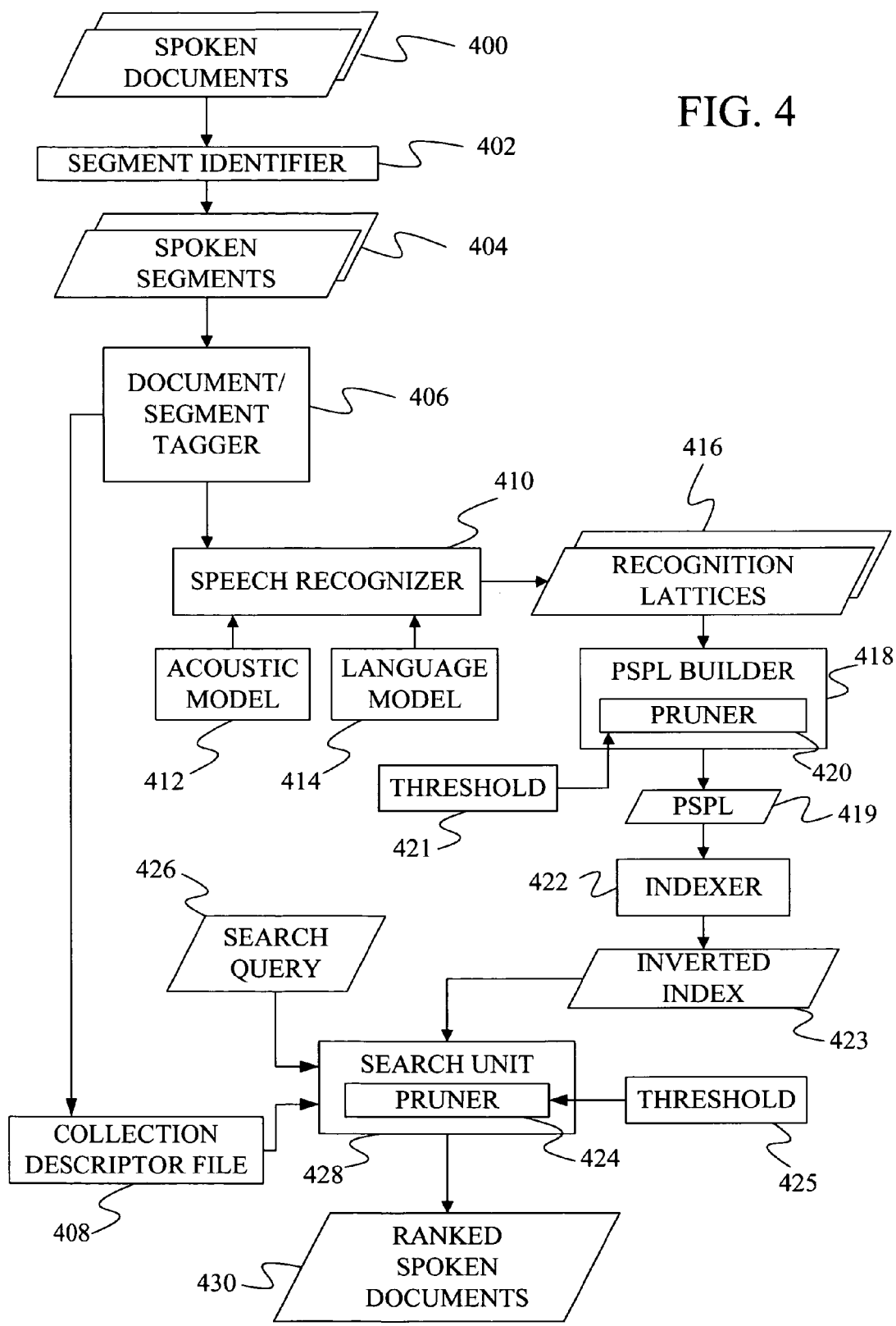
FIG. 4 is a block diagram of elements used to index a speech segment and search an index of a speech segment.

FIGS. 3 and 4 are illustrate a method and a block diagram, respectively, for forming and using an index of spoken documents. In step 300 of FIG. 3A, spoken documents 400 are received. These spoken documents may be stored so that all of the documents can be processed at the same time or individual documents may be received and processed separately. In other embodiments, each document is received in a streaming manner and is indexed without having to store the spoken document.

In general, a spoken document is a collection of speech signals that are related to each other in some manner. For example, speech signals that occur at a meeting, speech signals associated with a lecture, or speech signals associated with a multimedia document such as a movie or a multimedia presentation. To form spoken documents 400, some embodiments of the present invention separate the speech content from other content in a multimedia document. For example, the speech content may be removed from a movie to separate it from the video and musical content of the movie. When the spoken document represents only the speech content of a multimedia document, a mapping may be stored that links the spoken document to the multimedia document. This allows a path to the multimedia document to be returned in the search results.

Spoken documents can be very long. To assist in the speech recognition process, each spoken document is divided into spoken segments 404 by a segment identifier 402 at step 302. A spoken document then consists of an ordered list of segments. Under one embodiment, the segments are formed by dividing each spoken document at periods of silence. Techniques for identifying periods of silence in speech are well known in the art.

At step 304, a document/segment tagger 406 maps each segment and each spoken document to an integer value and stores the mapping in a collection descriptor file 408, which lists all documents and segments. In some embodiments, collection descriptor file 408 maps the integer value to a path name where the spoken document can be found. For spoken documents that were generated from multimedia files, collection descriptor file 408 can map the integer value to a path name where the multimedia document is stored.

In some embodiments, a single integer value is used to identify both the segment and the document. In such cases, the range of such values that are associated with each document must also be stored. In other embodiments, each document has a unique integer value and each segment within a document has a unique integer value as its identifier within the document. The integer values provide a compact reference to the documents/segments that can be efficiently stored in the index.

Each of the spoken segments 404 is provided to a speech recognizer 410, which uses an acoustic model 412 and a language model 414 to decode the spoken segments into possible text sequences at step 306 of FIG. 3.

Typically, speech recognizer 410 performs the recognition based on a sequence of feature vectors that represent the speech in the spoken segments.

The feature vectors used by the speech recognizer are formed by first converting an analog speech signal into digital values using an analog-to-digital converter. In several embodiments, the analog-to-digital converter samples the analog signal at 16 kHz and 16 bits per sample, thereby creating 32 kilobytes of speech data per second. These digital values are provided to a frame constructor, which, in one embodiment, groups the values into 25 millisecond frames that start 10 milliseconds apart. The frames of data created by the frame constructor are provided to a feature extractor, which extracts a feature from each frame.

Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used within the context of the present invention.

The steps needed to form the feature vectors can be performed entirely by speech recognizer 410, or some or all of the steps may be performed when generating spoken documents 400. Thus, spoken documents 400 may be stored as analog signals, digital signals, frames of digital signals, or feature vectors.

During recognition, each feature vector is applied to acoustic model 412, which provides a probability of each of a set of phonetic units given an input feature vector. The acoustic probability of a word is determined by combining the probabilities of the phonetic units that form the word. In addition, each word receives a language model score that indicates the probability of a word or a sequence of words appearing in a particular language. Using the scores provided by acoustic model 412 and language model 414, speech recognizer 410 is able to form a recognition lattice 416 that contains recognition results for a speech segment. Note that in most embodiments, speech recognizer 416 prunes unlikely word sequences from lattice 416 as it constructs the lattice, leaving only the top N recognition results in the lattice. In other embodiments, speech recognizer 410 produces an n-best list of recognition results that provides a list of the n most likely word sequences given the speech segment.

Note that although the system above segments the documents before providing the segments to speech recognizer 410, in other embodiments, spoken documents 400 are not segmented before being provided to speech recognizer 410. Instead, speech recognizer identifies periods of silence in the speech and at such points forces the lattice to converge to a single node before beginning a new lattice for the next portion of the spoken document. In this manner, speech recognizer 410 generates a separate recognition lattice for different segments of the spoken document. In such embodiments, speech recognizer 410 will include a document and segment identifier for each recognition lattice that it produces and will update the mapping in collection descriptor file 408.

Figure 5:
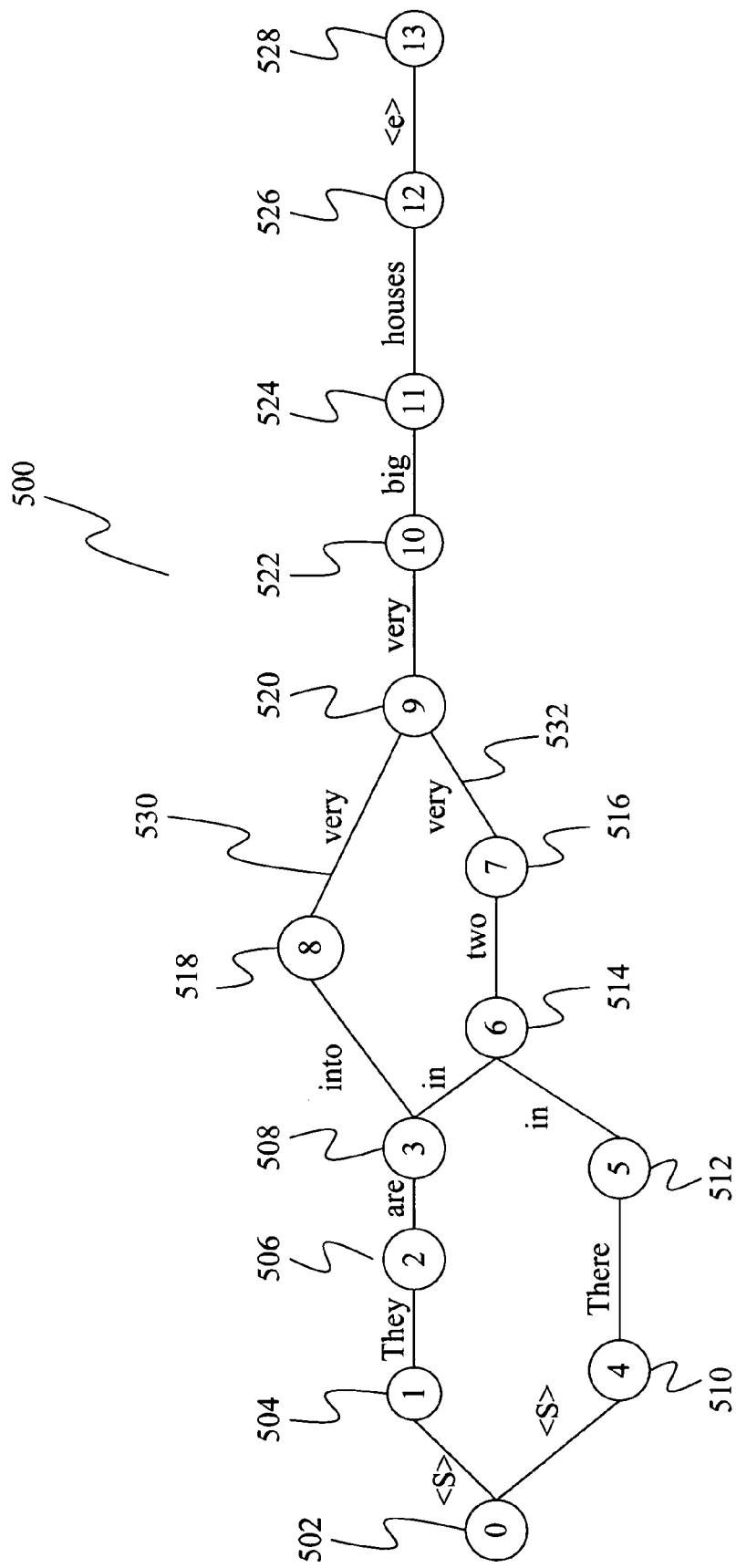
FIG. 5 is an example of a recognition lattice.

FIG. 5 provides an example of a recognition lattice 500 produced by speech recognizer 410. Lattice 500 includes states (also referred to as nodes) 502, 504, 506, 508, 510, 512, 514, 516, 518, 520, 522, 524, 526 and 528 which are labeled as states 0, 1, 2, 3, 4, 5, 6, 7, 8, 9, 10, 11, 12 and 13, respectively.

Every transition between states in lattice 500 is associated with a word, a start symbol or an end symbol. In addition, for language models that are based on sequences of multiple words (n-gram models where n is greater than 1), every transition into a state must contain the same word. For example, transitions 530 and 532 into state 520 both contain the word "very". Because of this, the word on a transition can equally be associated with the ending state of the transition.

Each transition also has an associated probability for the word located on the transition given the input speech signal. This probability is a function of an acoustic model score, a language model score, and various other parameters used to combine and modify those scores into a single probability. In particular, under one embodiment, the probability of a transition $t_I$ is stored as a log probability that is evaluated as:

$$\log P(t_i) = FLATw \left[ \frac{\log P_{AM}(t_i)}{LMw} + \log P_{LM}(\text{word}(t_i)) - \frac{\log P_{IP}}{LMw} \right] \quad \text{EQ. 1}$$

Where log $P(t_I)$ is the log probability for transition $t_I$, log $P_{AM}(t_I)$ is an acoustic model log likelihood assigned to the word of transition $t_I$, based on the correspondence between the feature vectors of a portion of the speech signal and the acoustic models of the phonetic units found in the word, log $P_{LM}(\text{word}(t_i))$ is the language model log probability assigned to the word on transition $t_I$, LMw is a constant weight, larger than 0, which compensates for difference in the range of possible values for the acoustic model and the language model, log $P_{IP}$ is an insertion penalty, which compensates for the speech recognizer's tendency to select short words over longer words, and FLATw is a flattening weight used to control how skewed the posterior distribution becomes on the lattice paths. In particular, FLATw helps to keep the speech recognizer from assigning most of the probability to one or two paths in the lattice.

Speech recognition lattice 500 of FIG. 5 shows that different path lengths can end at the same state. For example, there are two paths that reach state 514. One path includes the start symbol and the words "They are in" and the other path includes the start symbol and the words "There in". Thus, state 514, which represents the word "in", can be reached when "in" is in the second word position in the recognized text and when "in" is in the third word position in the recognized text, where word position is determined from the start of a word sequence. In addition, a single word may appear at different states but at the same word position in those states. For example, the word "very" enters state 520 on transition 532 in the fifth word position of the path "They are in two very". The word "very" is also in the fifth word position in the transition leading into state 522 along the path "There in two very very", where the last very is in the fifth word position.

In accordance with one embodiment, a position specific posterior lattice (PSPL) 419 is first constructed from this word lattice in order to form an index. In the position specific posterior lattice, each word position in the lattice forms a bin or entry. The word position can be integer based, in which the word position is based on count of the word transitions identified by the acoustic model from a reference (e.g., the beginning of the speech segment). The word position can also be time based, in which the word position is based on an elapsed time relative to a reference (e.g., the beginning of the speech segment). All words that occupy a particular word position are placed in the bin for that word position along with the probability of the word occupying that word position in the lattice. In order to form the position specific posterior lattice, each state is separated into a set of sub-states, with one sub-state for each word position that reaches the state.

FIG. 6 provides a listing of sub-states and their associated words that are formed from lattice 500 of FIG. 5. For example, sub-states 600 and 602 indicate that for state 6, there are two sub-states, one for the word "in" at position 2 and one for the word "in" at word position 3. Sub-states 604 and 606 indicate that the word "very" appears in word position 5 at both states 9 and 10.

A length-based or word position score is determined for each sub-state. This is shown at step 308 of FIG. 3A and is performed by position specific posterior lattice builder (PSPL Builder) 418 of FIG. 4.

Under one embodiment, the length-based scores at each state are calculated using a modification of the standard forward-backward algorithm used to score paths through a lattice. In particular, the probability of a word at a state n and a word position l can be calculated as:

$$P(n, l \mid LAT) = \frac{\alpha_n[l] \cdot \beta_n}{\text{norm}(LAT)} \quad \text{EQ. 2}$$

where $\alpha_n[l]$ is a forward score that is calculated recursively as:

$$\alpha_n[l] = \sum_{i=1}^{q} \alpha_{s_i}[l - 1 + \delta(\text{word}(t_i), \varepsilon)] \cdot \log P(t_i) \quad \text{EQ. 3}$$

where q is the number of states $s_i$ that transition into state n, log $P(t_i)$ is calculated using equation 1 above, $$\alpha_{\text{start}}[l] = \begin{cases} 1.0, l = 0 \\ 0.0, l \neq 0 \end{cases} \quad \text{EQ. 4}$$

and

-continued $$\delta(\text{word}(t_i), \varepsilon) = \begin{cases} 0 & \text{word}(t_i) \neq \varepsilon \\ 1 & \text{word}(t_i) = \varepsilon \end{cases} \quad \text{EQ. 5}$$

Where $\varepsilon$ represents a null transition that does not contain a word. Such null transitions are common in recognition lattices that utilize back-off language models. In EQ. 2, $\beta_n$ is calculated recursively as:

$$\beta_n = \sum_{j=1}^{r} \beta_{s_j} \cdot P[t_j] \quad \text{EQ. 6}$$

where r is the number of states connected to state n after state n and $P[t_j]$ is the probability associated with transitioning from state n to state $s_j$.

The normalizing value norm(LAT) of EQ. 2 is the value of $\alpha_n$ calculated at the end state of the speech recognition lattice. Note that the normalization is required because of the pruning performed during speech recognition.

After a length-based score has been determined for each observed word position at each state, the length-based scores are summed at step 310. In particular, each score that is for the same word position and for the same word is summed together to form a posterior probability that the word appears in the speech segment at that word position. This summation is expressed as:

$$P(w,l|\text{LAT}) = \Sigma_{n s.t. P(n,l) > 0} P(n,l|\text{LAT}) \cdot \delta(w, \text{word}(n)) \quad \text{EQ. 7}$$

where the summation is performed across all states n in the lattice where the length-based score is greater than zero.

The words and their respective probabilities formed through the sum of EQ. 7 are then stored based on their word position, l, to form position specific posterior lattice 419, as indicated at step 312.

Figure 7:
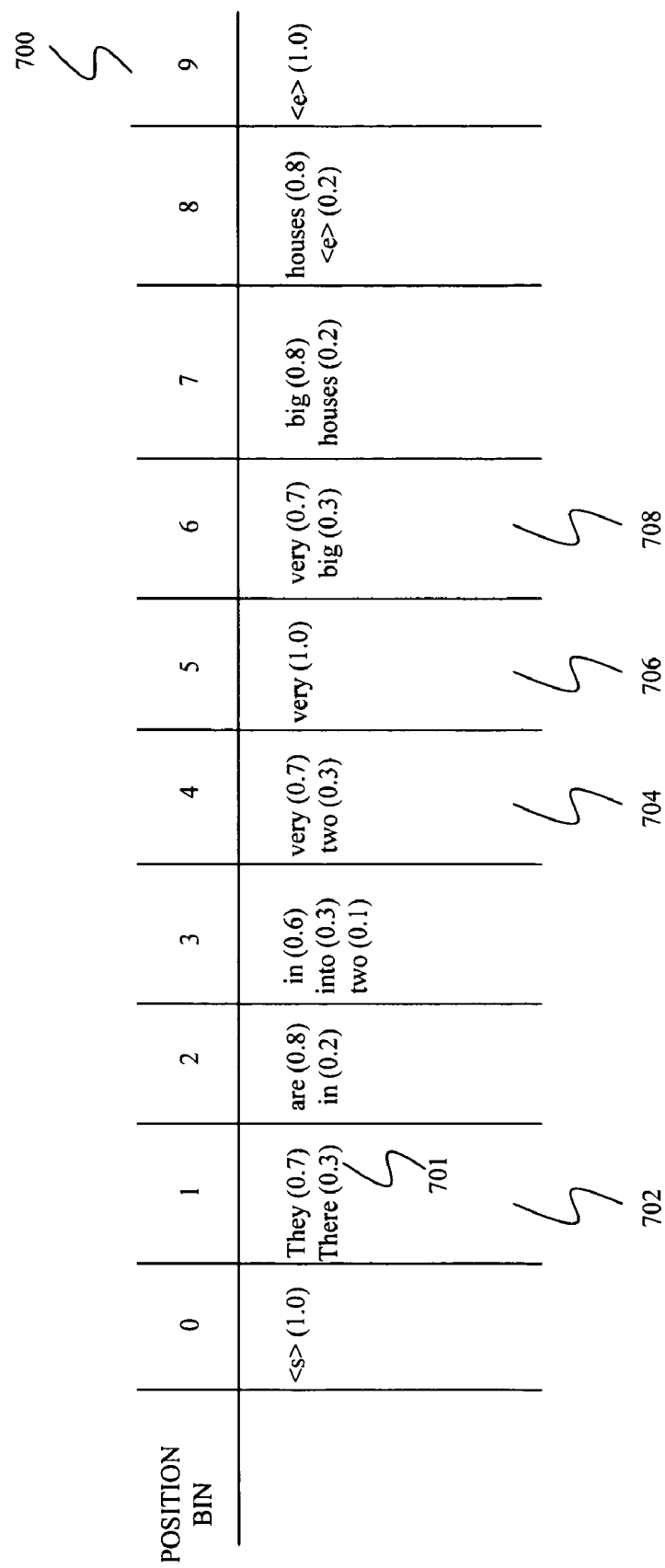
FIG. 7 is an example of a position specific posterior lattice.

An example of a position specific posterior lattice is shown in FIG. 7 where the possible positions are shown in row 700 and the words that occur at each position are shown below their respective position. For example, the words "They" and "There" respectively having probabilities 701 of 0.7 and 0.3, as indicated in parenthesis, occur in word position l as indicated by column 702. The word "very" has probabilities of 0.7, 1.0 and 0.7 of occurring in word positions 4, 5, and 6, respectively, as shown in columns 704, 706 and 708. Note that the position specific posterior lattice provides a more compact representation of the recognition results than the combination of lattice 500 and the sub-states of FIG. 6. The reason for this is that words that appear at the same word position but at different states in recognition lattice 500 are combined into a single entry in the position specific posterior lattice of FIG. 7. As a result the position specific posterior lattice is an index of candidate words or sub-words for the speech segment that is organized by word position where the entries corresponding to each word position includes the candidate words for that position and a probability that the candidate word appears at the word position.

The exemplary probabilities of FIG. 7 have been normalized such that the probabilities of each entry add up to 1.0. However, other probability scoring techniques (e.g., non-normalized or normalized to a different number) can also be used.

In other embodiments, the position specific posterior lattice is constructed from an n-best list. The same technique described above can be used to construct the position specific posterior lattice by first forming a recognition lattice from the n-best list. This can be accomplished by tying the first word of each entry in the n-best list to a common start node, and the last word of each entry in the n-best list to a common end node.

PSPL Pruning

In accordance with one embodiment, the position specific posterior lattice is pruned of speech units that have a low probability of appearing in the corresponding speech segment relative to a threshold value. In general, the words in the entries of the position specific posterior lattice are eliminated by a pruner 420 of the position specific posterior lattice builder 418 based on a comparison of their probabilities to a threshold value 421, as indicated at step 313. The threshold value can be adjusted to provide the desired level of pruning of the position specific posterior lattice. A low threshold value setting will result in a smaller number of words that are eliminated during the pruning process relative to when a high threshold value is selected. Additionally, a low threshold value allows for less precise candidate words to remain in the position specific posterior lattice relative to when a high threshold value is chosen.

In one embodiment, a direct comparison of the probabilities of the words in the position specific posterior lattice to the threshold value or probability is made. The words having probabilities that do not exceed the threshold probability, or fail to meet another predefined relationship to the threshold, such as match or exceed the threshold value, are eliminated from the corresponding bin or entry of the position specific posterior lattice. For example, when the threshold value is set to 0.2, the words or speech units "in" in word position or entry 2, "two" in word position or entry 3, "houses" in word position or entry 7, and "<e>" (end symbol) in word position or entry 8, would be eliminated when the predefined relationship required that the probability exceed the threshold value. This type of pruning can be carried out either directly on the PSPL or on the index itself, as discussed below.

In another embodiment, the threshold value is compared to a relative probability that is based on the probabilities of at least two of the speech units (words or sub-words) of an entry. In one embodiment, the threshold value is compared to a relative probability of a candidate speech unit of the entry that is being considered for elimination to the highest probability of the entry. When the relative probability fails to meet a predefined relationship to the threshold value (e.g., is less than, matches or exceeds), the candidate speech unit is eliminated from the entry. This type of pruning can only be carried out on the PSPL in a computationally efficient manner.

Equation 8 illustrates one embodiment where P1 represents the highest probability of the entry, P2 represents the probability of the candidate speech unit or word $w_k$ of the entry, and $\tau_{ref}$ represents the predefined threshold value. When the probabilities have been normalized to 1.0, as in the exemplary entries of FIG. 7, the log of the ratio P1/P2 can be used and $\tau_{ref}$ can be a values from − to 0, as indicated in Equation 8. The closer the setting of the threshold value to 0, the closer the probability of the candidate speech unit must be to the highest probability in order to avoid elimination.

$$W_k \text{ is eliminated when } \log(P2/P1) > \tau_{ref} \quad \text{EQ. 8}$$

For example, if the speech unit "into" of word position or entry 3 (FIG. 7) is selected as the candidate speech unit having a probability of 0.3, the relative probability is equal to the log of 0.3 divided by 0.6, which is the highest probability of entry 3 corresponding to the word "in", which equals −0.3. Thus, in accordance with the exemplary embodiment provided above, the word "into" in entry 3 will avoid elimination from the position specific posterior lattice only if the predefined threshold value is less than −0.3.

Other suitable relative probabilities can also be used. For example, the relative probability can be a ratio of the probability of the candidate speech unit to the highest probability. In this case, the candidate speech unit is eliminated when the ratio is greater than (or equal to) the threshold value. Similarly, the relative probability can be a ratio of the highest probability to the probability of the candidate speech unit. The candidate speech unit is eliminated when the relative probability is less than (or equal to) the threshold value.

In one embodiment, the probabilities of the words or speech units of entries of the position specific posterior lattice are renormalized after one or more of the speech units have been pruned from them. This operation simply requires a transformation of the remaining probabilities into probabilities that add up to 1.0. Thus, for example, if the word "two" is eliminated from entry 3 (FIG. 7) following a pruning operation, the respective probabilities 0.6 and 0.3 of the remaining entries "in" and "into" are renormalized by dividing them by their sum, or 0.9. After renormalization, entry 3 will contain "in" having a probability of 0.67 and "into" having a probability of 0.33. Other suitable renormalization processes can be performed on the remaining entries of the position specific posterior lattice as dictated by the characteristics of the lattice.

Building an Inverted Index

While the position specific posterior lattice constitutes an index that organizes the speech unit data for the speech segment(s) by position while also providing probability information about the speech units, such an index is not very useful as the index of a search service. Such systems require indexes that can be searched quickly to find results that relate to an input query.

One suitable index for such search services is an inverted index. The words or sub-words in an index each constitute the entries in the index while the information provided in each entry is the location of the word or sub-word in the documents represented by the index. As a result, the inverted index can be considered an inversion of the position specific posterior lattice.

Embodiments of the present invention relate to building such an inverted index using the pruned or whole position specific posterior lattice described above and providing a search service using the inverted index. At step 314, an indexer 422 builds an inverted index 423 based on the position specific posterior lattice. Under one embodiment, this inverted index is formed by providing an entry for every word in the recognition grammar, as mentioned above. In each entry, information is provided for each position in the position specific posterior lattices where the entry's word appears. This information includes the document and segment identifier associated with the position specific posterior lattice, the position bin in which the word is placed in the lattice, and the probability associated with that word in that position.

FIG. 8 provides a generic representation of an entry 800 for a word w[k]. In FIG. 8, entry 800 includes a collection of sub-entries including sub-entries 802, 804, 806, 808, 810, 812, and 814. Each sub-entry includes information such as a document identifier, such as document identifier 816, a segment identifier, such as segment identifier 818, a position in the segment such as position 820 and a probability of the word appearing in that position in the segment such as probability 822. Sub-entries 802, 804 and 806 are for the same document and segment. Sub-entries 808 and 810 are for the same document as sub-entries 802, 804, and 806, but are for a different segment. Sub-entries 812 and 814 are for separate documents. Entry 800 will include sub-entries for every document, segment and position where the word appears.

In some embodiments, each entry is stored as a separate file in order to allow easy incremental updates of the index.

Inverted Index Pruning

The inverted index will generally be used with a search service to allow a user to search the speech index 423 for a spoken document that is related to a search query. One embodiment is directed to providing the user with control over the precision of the search by allowing the user to prune word location entries from the inverted index that have low probabilities of appearing at the given location relative to a threshold value. This pruning happens at query run-time; the same query can be run at different pruning thresholds and obtain different Precision/Recall trade-offs.

In general, the speech units (words or sub-words) represented by the position information in the entries in the inverted index 423 are eliminated based on a comparison of the probabilities to a threshold value 425. The threshold value can be adjusted to provide the desired level of pruning of the position specific posterior lattice. A low threshold value setting will generally result in a smaller number of word location entries that are eliminated during the pruning process relative to when a high threshold value is chosen. Additionally, a low threshold value allows for the location of less precise candidate speech units to remain in the inverted index 423 relative to when a high threshold value is selected.

In one embodiment, a direct comparison of the probabilities of the words in the position specific posterior lattice to the threshold value or probability is made. The words having probabilities that do not exceed the threshold probability, or fail to meet another predefined relationship to the threshold, such as match or exceed the threshold value, are eliminated from the corresponding bin or entry of the position specific posterior lattice. For example, when the threshold value is set to 0.2, the words or speech units that have positions whose associated probabilities are less than 0.2 would be eliminated from the index 423 when the predefined relationship requires that the probability exceed the threshold value.

Searching The Index

Once the index has been constructed, a search may be performed to identify a spoken document based on a search query. In particular, at step 315 of the flowchart of FIG. 3B, a search query 426 is received by a search unit 428. In one embodiment, the threshold value 425 is also received and the inverted index pruning described above is performed to form the inverted index 423 in a pruned form.

At step 316, search unit 428 accesses and searches the inverted index 423 and, at step 317, retrieves the document identifier, segment identifier, position, and probability of each sub-entry for each word of the query. Any words that are outside of the speech recognizer's vocabulary are mapped to an unknown token UNK, which cannot be matched in any document. The unknown token acts as a placeholder but does not provide a value in the calculation of a score for the query.

In one embodiment, the positions of the retrieved entries are eliminated based on a comparison of their probabilities to the threshold value 425, as indicated at step 318. In one embodiment, the probabilities that fail to meet a predetermined relationship (e.g., meet or exceed) to the threshold value 425 are eliminated from consideration as search results.

At step 319, a score is determined for each document that is returned from the search of inverted index 423. The documents that are returned from the search can be limited such that every document that is returned includes all of the words of the query. Alternatively, any document that contains at least one word of the query can be returned at this stage. Using the probabilities returned from inverted index 423, the scores for each document are calculated by first calculating a collection of composite n-gram scores for each document. Each composite n-gram score is formed by summing individual n-gram scores over all possible formations of an n-gram in the query using:

$$S_{N-gram}(D, Q) = \sum_{i=1}^{K-N+1} S(D, q_i \ldots q_{i+N-1})$$ EQ. 8 where D is the document, K is the number of words in the query, N is the number words in the n-gram, Q is the query, and $S(D,q_i \ldots q_{I+N-1})$ is the score for a single n-gram beginning at point I in the query, which is calculated as:

$$S(D, q_i \ldots q_{i+N-1}) = \log\left[1 + \sum_s \sum_k \prod_{l=0}^{N-1} P(w_{k+l}(s) = q_{i+l} | D)\right]$$ EQ. 9 where the inner summation on the right-hand side is performed over the first k−N word positions in a segment and the outer summation is performed across all segments associated with document D. In EQ. 9, $P(w_{k+l}(s)=q_{I+l}|D)$ is the posterior probability stored in the inverted index for the word at position k+l for document D and segment s.

If more than one composite n-gram score is calculated for each document, the separate composite n-gram scores are combined in a weighted sum using:

$$S(D, Q) = \sum_{N=1}^{K} w_N \cdot S_{N-gram}(D, Q)$$ EQ. 10

Where $w_N$ is the weight associated with a particular N-gram and K is the number of words in the query.

In many embodiments, the weights of the n-grams increase linearly with the n-gram order. However, other techniques may be used to set the weights of the n-grams.

The scores calculated for each document are used to rank the documents that are to be returned. The documents that are returned may be pruned by removing documents that do not provide a non-zero score for the highest order composite n-gram. This ensures that all of the words of the query appear in order at least once in the document. This requirement enforces a quoted functionality, which requires all of the words present and in the same order as in the query in order for a document to be identified from the query. Another possibility is to allow quoting of phrases within the query, such as JAPAN "NUCLEAR WEAPONS"; entering such a query will return only documents that contain JAPAN and NUCLEAR and WEAPONS, and the words NUCLEAR WEAPONS occur exactly in this order next to each other.

At step 320, the documents identified and scored by search unit 428 are returned as ranked documents 430. In many embodiments, search unit 428 accesses collection descriptor file 408 to convert the document identifier into the path name of the location of the document. This path name is then returned.

In a further embodiment of the invention, morphological analysis is performed on the query before applying the query to the index. This generates a list of different forms of the query terms, including other endings for the word. For example, the term "weapons" in a query would produce the alternative "weapon" in which the final "s" has been dropped. Different combinations of the morphologically altered terms can then be used to perform different searches of the inverted index. Each search involves forming composite n-gram scores as above. The composite n-gram scores for the alternative search strings are weighted much less than the composite n-gram scores for the original search string. As a result, documents that contain an alternative search string but not the original search string will be ranked below documents that contain the original search string.

Although the indexing technique has been discussed above with reference to complete words, the same technique can be used to index any speech unit including sub-word units, such as phones or tri-phones. In particular, instead of forming a lattice of words, the speech recognizer forms lattices of sub-word units. These sub-word units are scored in the same manner as the words above using a language model that is based on sequences of sub-word units instead of words. The position specific posterior lattice will then contain individual sub-word units with their associated probabilities.

Upon receiving a search query, the query is decomposed into sub-word units. Documents are then ranked using the scoring techniques described above with sub-word units instead of words. In some embodiments, each word in the query can be treated as being contained in quotations to reduce the number of documents that are returned.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, the PSPL is a form of an index. Thus, terms used herein referring to an index can also describe the PSPL. Additionally, although the embodiments have been described with reference to the PSPL indexing technique, any other soft-indexes of spoken documents that use "hit" probabilities can make use of the pruning embodiments described above. Furthermore, while the speech index includes an index of words contained in spoken documents, the index can also include words extracted from written documents.

What is claimed is:

1. A computer-implemented method of searching a speech index comprising:
    accessing a speech index of a plurality of spoken documents each comprising a collection of speech signals using a processor, wherein the speech index comprises a plurality of word entries, each entry identifying a plurality of candidate positions for a word in the plurality of speech signals and a probability of the word appearing at each of the candidate positions given the corresponding speech signal;
    receiving a search query comprising a target word from a user using the processor;
    receiving a first threshold value from the user using the processor;
    searching the speech index for one of the word entries that matches the target word of the search query using the processor;

retrieving from the matched entry the plurality of candidate positions for the target word and the probability of the word appearing at each of the candidate positions, using the processor;

eliminating the candidate positions based on a comparison of the probability of the word appearing at a candidate position and the first threshold value;

ranking the speech signals based on the probabilities of the remaining candidate positions relative to each other to form ranked speech signals using the processor; and returning search results to the user based on the ranked speech signals using the processor, the search results comprising an identification of one or more of the spoken documents.

2. The method of claim 1, wherein eliminating the candidate positions comprises comparing the probabilities of the candidate positions to the first threshold value and eliminating those candidate positions whose probabilities fail to reach a predefined relationship to the first threshold value using the processor.

3. The method of claim 1 further comprising modifying the target word of the search query to form a modified target word and searching the index for an entry associated with the modified target word.

4. The method of claim 1, further comprising:

receiving a second threshold value from the user;

replacing the first threshold with the second threshold;

eliminating the candidate positions based on a comparison of their probabilities to the second threshold value using the processor;

ranking the speech signals based on the probabilities of the remaining candidate positions relative to each other to form ranked speech signals using the processor; and returning search results to the user based on the ranked speech signals using the processor, the search results comprising an identification of one or more of the spoken documents.

5. A computer-implemented method of searching a speech index comprising:

accessing a speech index of a plurality of spoken documents each comprising a collection of speech signals using a processor, the speech index comprising positions of words in the speech signals, and a probability of the words appearing at each of the positions given the corresponding speech signal;

receiving a search query from a user using the processor;

receiving a first threshold value from the user using the processor;

eliminating the positions of words from the speech index based on a comparison of the probability of a word appearing at a position to the first threshold value to form a pruned speech index using the processor;

searching the pruned speech index for an entry associated with a word in the search query using the processor;

retrieving from the entry candidate positions for the word and their probabilities using the processor;

ranking the speech signals based on the probabilities of the candidate positions to form ranked speech signals using the processor; and returning search results to the user based on the ranked speech signals using the processor, the search results comprising an identification of one or more of the spoken documents.

6. The method of claim 5, wherein eliminating the positions comprises comparing the probabilities of the positions to the first threshold value and eliminating those positions whose probabilities fail to reach a predefined relationship to the first threshold value using the processor.

7. The method of claim 5, further comprising:

receiving a second threshold value from the user;

replacing the first threshold with the second threshold;

eliminating the candidate positions based on a comparison of their probabilities to the second threshold value using the processor;

ranking the speech signals based on the probabilities of the remaining candidate positions relative to each other to form ranked speech signals using the processor; and returning search results to the user based on the ranked speech signals using the processor, the search results comprising an identification of one or more of the spoken documents.

8. A computer-implemented method of searching a speech index comprising:

accessing a speech index of a plurality of spoken documents each comprising a collection of speech signals using a processor;

receiving a search query from a user using the processor;

modifying a word of the search query using the processor;

receiving a first threshold value from the user using the processor;

searching the speech index for an entry associated with the modified word using the processor;

retrieving from the entry a plurality of candidate positions for the modified word in a plurality of the speech signals, and a probability of the modified word appearing at each of the candidate positions given the corresponding speech signal, using the processor;

eliminating the candidate positions based on a comparison of their probabilities to the first threshold value using the processor;

ranking the speech signals based on the probabilities of the remaining candidate positions relative to each other to form ranked speech signals using the processor; and returning search results to the user based on the ranked speech signals using the processor, the search results comprising an identification of one or more of the spoken documents.

9. The method of claim 8, wherein eliminating the candidate positions comprises comparing the probabilities of the candidate positions to the first threshold value and eliminating those candidate positions whose probabilities fail to reach a predefined relationship to the first threshold value using the processor.

* * * * *